United States Patent
Meilander

[15] 3,665,464
[45] May 23, 1972

[54] METHOD AND APPARATUS FOR HIGH SPEED VEHICLE POSITION ACQUISITION

[72] Inventor: Willard C. Meilander, Kent, Ohio

[73] Assignee: Goodyear Aerospace Corporation, Akron, Ohio

[22] Filed: May 1, 1969

[21] Appl. No.: 821,028

[52] U.S. Cl..................................343/6.5 R, 343/112 TC
[51] Int. Cl............................................G01s 9/56
[58] Field of Search..................343/6.5, 6.5 LC, 6.8, 6.8 LC, 343/112 TC

[56] References Cited

UNITED STATES PATENTS

| 3,341,846 | 9/1967 | McMurren et al................343/6.8 LC |
| 3,419,865 | 12/1968 | Chisholm..........................343/112 TC |
| 3,474,460 | 10/1969 | Huebscher........................343/6.5 LC |

*Primary Examiner*—Malcolm F. Hubler
*Attorney*—J. G. Pere and L. A. Germain

[57] ABSTRACT

A transmitted interrogation and multiple receptions are utilized to provide aircraft position determination at high speed. A processing application of a data processor is utilized to implement the extensive data handling requirements of the system. The system may be ground based or is completely compatible with a navigational satellite or suitably equipped aircraft. Overlapped responses are substantially eliminated by discretely interrogating aircraft or other vehicles in accordance to distance.

9 Claims, 10 Drawing Figures

INVENTOR
WILLARD C. MEILANDER
BY:
Oldham & Oldham
ATTORNEYS

INVENTOR
WILLARD C. MEILANDER
BY:
Oldham & Oldham
ATTORNEYS

METHOD AND APPARATUS FOR HIGH SPEED VEHICLE POSITION ACQUISITION

Present F.A.A. and military practice determines aircraft position through the use of scanning radar or scanning beacon systems. In radar, the range and azimuth angle to aircraft targets are determined, and through coordinate transformation, the grid $(x, y)$ coordinates of aircraft can be determined.

In the beacon system, typically a plurality of types of interrogation can be transmitted and beacon equipped aircraft respond according to the type. For example, identity or altitude code would be transmitted. As in radar, the range is measured to the first signal of the response, which, with the azimuth angle, provides, after transformation, grid coordinate position. Naturally, the beacon also provides identity and altitude of the responding aircraft.

Several problems arise in both radar and beacon systems. Specifically, angular accuracy is relatively poor; aircraft at the same slant range within the antenna beam width are overlapped in response which makes radar resolution difficult or impossible and garbles beacon responses; and in the case of beacon, since all of the aircraft operate on the same frequency, and can be interrogated by any ground interrogator, a great overlapping of replies to a multiplicity of ground station interrogations occurs.

The proposed system will virtually eliminate the foregoing and other objections to and problems with these prior art systems by taking advantage of the fact that the beacon is a two-way data link in which a discrete interrogation code is sent out and the aircraft responds with the beacon cooperating with three or more receivers appropriately positioned to provide position of the aircraft, thus greatly enhancing resolution capabilities of the system.

A further object of the invention is to provide a relatively inexpensive high resolution position acquisition system which utilizes existing or simple modification of equipment with the new concept for implementation thereof in combination with existing computer equipment to provide high resolution position information at high speed.

For a better understanding of the invention, reference should be had to the accompanying drawings wherein.

A primary object of the invention is to provide utilization of the beacon with much greater effectiveness. A great improvement could be obtained by interrogating each aircraft in one of two modes with a very short separation in time of as little as, for example 0.02 to about 10 seconds. In the first mode, a specific discrete aircraft code would be transmitted from the ground. The aircraft, automatically in recognition of its code, would respond with its identity and/or altitude. A second mode would interrogate all aircraft not responding to the last interrogation cycle. More than 12,000 aircraft could be accommodated in each cycle. The second mode would detect new aircraft entering the system, and detection of their replies including identity would allow their inclusion in the system so that they would then begin to be interrogated by the first mode, specific discrete aircraft code.

With this easily accomplished change in beacon operation, an omni-directional trilateration position locater becomes feasible with the invention. Not only is the position locater easy to implement, but the measured position could be at least an order of magnitude more precise than that achieved with primary radar. Further, at limited distances from the sensor, the actual altitude of the aircraft can be measured and such measurement could be used to check the aircraft altimeter.

Figure 1:
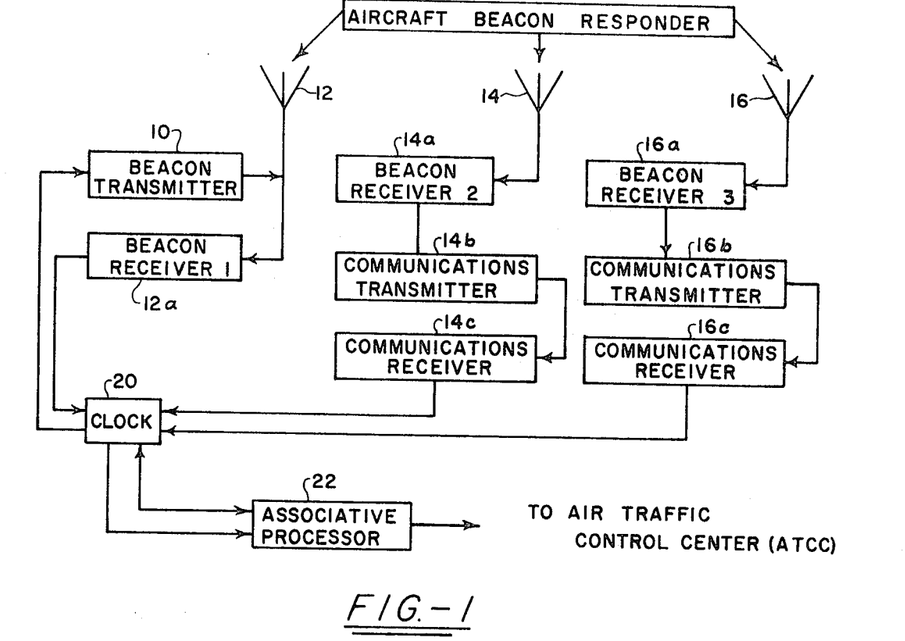
FIG. 1 is a schematic block diagram showing the overall system comprising an embodiment of the invention.

In implementing such a system, a beacon transmitter illustrated by numeral 10 in FIG. 1, and three omni-directional antennae 12, 14 and 16 cooperate with their respective beacon receivers 12a, 14a, and 16a, respectively. It should be understood that antenna 2 and antenna 3 are located physically spaced distances from antenna 1, and that their corresponding beacon receivers 14a and 16a, are located with the antennae. However, it should be understood that neither transmitters or receivers must be physically located with each other. Preferably, all the antennae are located at convenient high spots and could be spaced on tall towers similar to those supporting UHF television antennae. Careful selection of transmitter and receiver sites to gain height and mounting of antennae on towers high enough above the terrain will result in much greater coverage than can be achieved with ground based radars for low flying aircraft. Preferably, the antennae are placed out of alignment with each other, and so that the central transmit receive antenna 1 is at the center of a substantially right triangular configuration. A preferred spacing would be about 10 miles between antennae.

The beacon receiver 14a and receiver 16a both feed to respective communication transmitters 14b and 16b, which are also physically located with the receivers. The transmitters then transmit to separate communication receivers 14c and 16c which are located with the equipment associated with antenna 1. The resultant outputs from receiver 12a and receivers 14c and 16c feed through a clock circuit 20 which may comprise a portion of an associative data processor 22 located at the side of antenna 1. It should be understood that any data processing apparatus could be utilized and that the processor need not be located at the site of the antennae, as more fully defined hereinafter. The clock circuit 20 properly times the transmission pulses by transmitter 10, and the reception times so accurate distance measurements of the aircraft are generated. The location of the circuit 20 is not critical, but some type of coordinated timing is required for the overall system.

Figure 2:
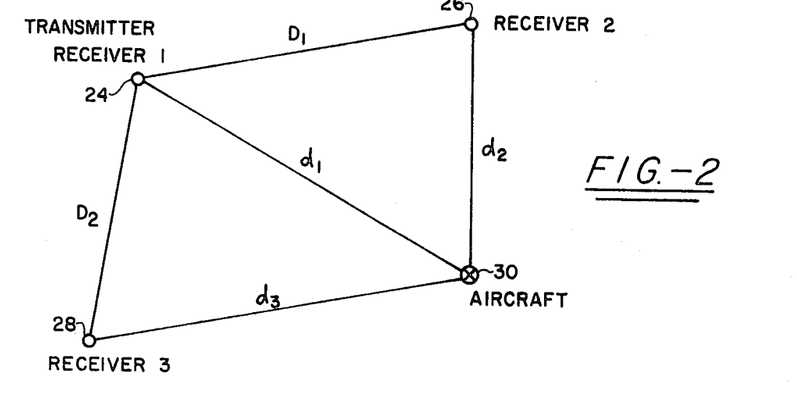
FIGS. 2 and 3 are schematic illustrations of the problem to be solved for the position determination achieved by the invention.

FIG. 2 illustrates a physical setup of the antennae and equipment of FIG. 1. Specifically, a transmitter receiver site which includes antenna 1 is indicated by numeral 24. Receiver site $R_2$ indicated by numeral 26 includes antenna 2 and receiver site $R_3$ indicated by numeral 28 includes antenna 3. Note, the respective distances between points 24 and 26 as indicated by $D_1$ with the distance between 24 and 28 indicated by $D_2$. The invention contemplates that $D_1$ and $D_2$ will be about 10 miles. An aircraft is indicated by numeral 30 with the respective distances of the aircraft to receivers at points 24, 26 and 28 indicated by lines $d_1$, $d_2$ and $d_3$.

Figure 2A:
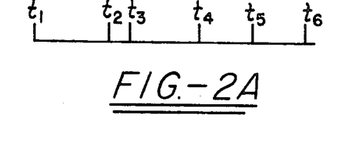
FIGS. 2A, 3A, and 3B are time graphs illustrating transmission and reception problems to be solved by the invention.

To determine the position of aircraft 30, a discrete interrogate pulse group would be sent from the transmitter at point 24 to the aircraft at time $t_1$ controlled by the clock circuit 20, as seen in FIG. 2A. The signal would arrive at the aircraft at time $t_2$ and a reply from the aircraft would be transmitted at time $t_3$. The reply would arrive at receiver 2 at time $t_4$, at receiver 1 at time $t_5$ and a receiver 3 at time $t_6$.

Then, $$d_1 = \frac{(t_2 - t_1 + t_5 - t_3)}{2} c$$

with $c$ the velocity of light.

Times $t_2$ and $t_3$ are unknown, but $t_3$ minus $t_2$ is the transponder turn-around time which would be known. Let $t_3$ minus $t_2$ equal $t_a$.

Thus, $$d_1 = \frac{(t_5 - t_1 - t_a)}{2} c$$

Similarly, the following would result:

$$D_2 = (t_4 - t_1 - t_a) c - d_1$$
$$d_3 = (t_6 - t_1 - t_a) c - d_1$$

Simple triangulation and translation would then provide the aircraft position in the operation coordinate system. Only two receivers could provide position information, but position ambiguity would generally result that would be undesirable. However, when an aircraft is being tracked, and the signal from one antenna is lost temporarily, track information will generally correct for any ambiguities which may result.

Figure 3:
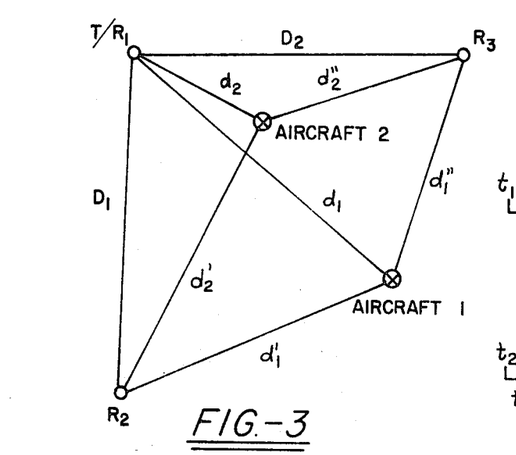
Figure 3A:
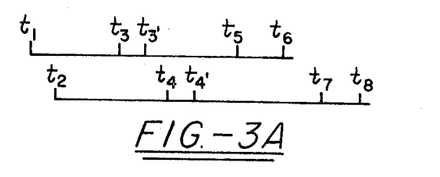

In the schematic of FIG. 3, a coded signal is sent to aircraft 2 at time $t_1$, as shown in FIG. 3. At time $t_2$ a second coded signal is sent to aircraft 1. At time $t_3$ and $t_4$ the coded signals are received at the respective aircraft and at $t_3'$ and $t_4'$ the replies of aircraft 2 and 1 are transmitted respectively. At times $t_5$ and $t_6$ the aircraft number 2 responses are received on the ground at receivers 1 and 2 respectively and aircraft number 1 responses are received at $t_7$ and $t_8$. From the responses, distances $d_1$, $d_1'$, $d_2$ and $d_2'$ can be determined. Since $D_1$ is known, the position of the aircraft can be determined. An ambiguity exists in that the aircraft could have also been at an equal position to the left of line $D_1$. This ambiguity is resolved by a measurement of distances $d_1''$ and $d_2''$ at receiver number $R_3$.

Figure 3B:
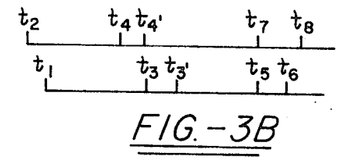

One of the difficulties with both the systems illustrated in FIGS. 2 and 3 is overlap of returning signals. This is shown in FIG. 3B. It can be seen that if aircraft number 1 was first interrogated, followed by aircraft number 2, the aircraft response would become intermingled and the desired measurement would not be made. A solution can be achieved by delaying interrogation of a second aircraft until the maximum expected time of response for the first has passed. However, this is time consuming, would greatly increase the time to interrogate a number of aircraft, but perhaps under certain circumstances of limited traffic density would be acceptable in a ground based system. However, in a satellite system using time measurements from two or more synchronous, near synchronous, or non-synchronous satellites for position determination the time for interrogation of say 1,000 aircraft would become excessive.

Figure 4:
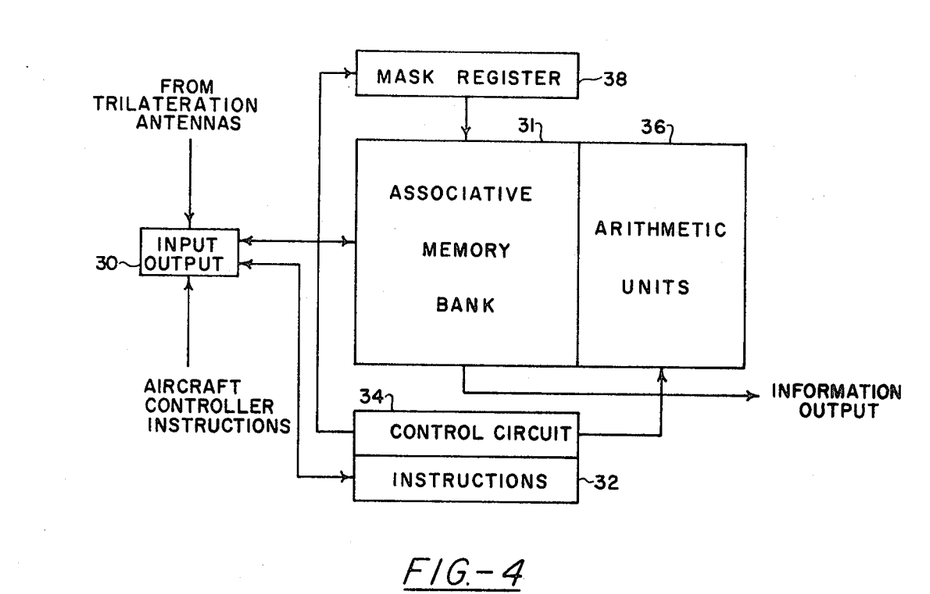
FIG. 4 is a block diagram schematic of a typical associative processor approach to solve the problems represented by FIGS 2 and 3 of the drawings.
Figure 5:
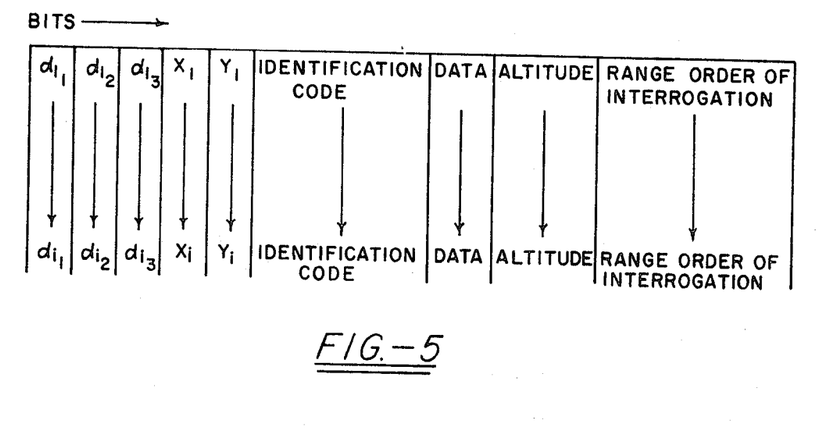
FIG. 5 is a table illustrating the type of information which might be stored in the memory of the computer of FIG 4 to achieve the position information desired.

The response times and altitude of each aircraft would be passed through an input/output circuit 30, as indicated in FIG. 4 which comprises a portion of the associative processor 22 of FIG. 1. In effect, the information will be written into memory as for example shown in FIG. 5, where $dl_1$, $dl_2$, and $dl_3$ comprise the first three fields of the first word in memory and on down through $di_1$, $di_2$ and $di_3$ which are the first three fields of the $i$ th word in memory. The words represent all the aircraft in the system. A signal denoting the existence of information is sent into an instruction bank indicated by block 32 which effects the proper write instruction, all in the manner well understood by those skilled in the art. The control circuit coordinates with an arithmetic unit associated with the memory bank 31, and indicated by block 36. The arithmetic unit 36 essentially comprises a separate unit for each word of the memory bank 31, and when all aircraft have been interrogated upon instructions from the control circuit 34 the separate arithmetic units simultaneously calculate the $x$ and $y$ position of all the aircraft with respect to an $x$ and $y$ coordinate through the location of antenna 1 preferably on north-south, east-west lines on the basis of each aircraft generating its respective $d1$, and $d2$ and $d3$ information. This $x$ and $y$ information is then sent from the arithmetic unit and stored in the memory bank in the next bits of the respective word to which it is associated, again as indicated in FIG. 5.

In addition, the trilateration system interrogation signal from the beacon transmitter 10 will normally contain the identification code for each aircraft. This code may be obtained by general interrogation of all aircraft as previously described, or may be determined from previously filed flight plan information and might be included as a plurality of bits of each word stored in the memory 31 as indicated in FIG. 5. Additional fields or bits are provided following each identification code for storing position and aircraft control data that might be used by an aircraft controller for control purposes and is indicated as data in FIG. 5. Note, for example that the output of the associative processor 22 of FIG. 1 is to an Air Traffic Control Center (ATCC), or if processor 22 is located at an ATCC, the output may be, for example, to a controllers display, such as shown in my co-pending application Ser. No. 1,495, filed Dec. 29, 1969

AREA COMMUNICATION SYSTEM PLAN

In a typical area plan shown in FIG. 7, the AREA TRAFFIC CONTROL CENTER (hereinafter referred to as ATCC) 100 covers an area that might be for example 400 by 400 nautical miles. In the typical system shown, included are four trilateration installations 102, 104, 106 and 108, four air terminals, 110, 112, 114 and 116, and four air terminal towers, 118, 120, 122 and 124. The trilateration systems are connected to the ATCC 100 by any communications means such as two-way coax or microwave links each respectively indicated by numerals 102a, 104a, 106a and 108a. The beacon links between the aircraft and the trilateration systems provide all the required air to ground and ground to air data for aircraft three-dimensional position determination and traffic control. Note aircraft 126 associated with trilateration system 102 and aircraft 128 associated with trilateration system 108. The VHF two-way voice links between both the ATCC 100 and respective terminal towers 118 and 124 to the aircraft 126 and 128 are for emergency or backup communication and control.

Each of the respective trilateration systems 102 through 108 interrogates only those aircraft in their respective areas with these areas determined at the ATCC 100, and in the example illustrated, are simply quadrants approximately 200 nautical miles times 200 nautical miles in size based on north-south, east-west coordinates through the ATCC 100. In FIG. 7, for example, trilateration system 102 would interrogate only aircraft in a sector with the ATCC 100 at an $x$, $y$ central coordinate of 0, from 270° to 360°. Similarly, trilateration system 104 would interrogate aircraft only in the 0° to 90° sector with respect to true north.

Each of the towers 118 through 124 is provided the necessary data from the ATCC 100 over cable or microwave link on all arriving and departing aircraft relative to the respective terminal area. Normal VFR and IFR procedures would apply to arriving and departing aircraft at each terminal. In route aircraft would also be controlled by the center 100. While the plan shown in FIG. 7 illustrates only one ATCC 100, it should be understood that similar centers would be placed to cover similar, larger, or smaller nautical mile configurations as the situation demanded, and adjacent centers would be linked to hand over aircraft traversing from one center to another, and also with reference to emergency operations. Each ATCC is provided updated flight plan data on all IFR aircraft entering or departing their assigned area from the overall continental flight plan control center which might be centrally located with respect to the total land mass being controlled through such a plan. The invention contemplates that the trilateration systems 102 through 108 will be unattended and controlled remotely from the ATCC 100.

Figure 7:
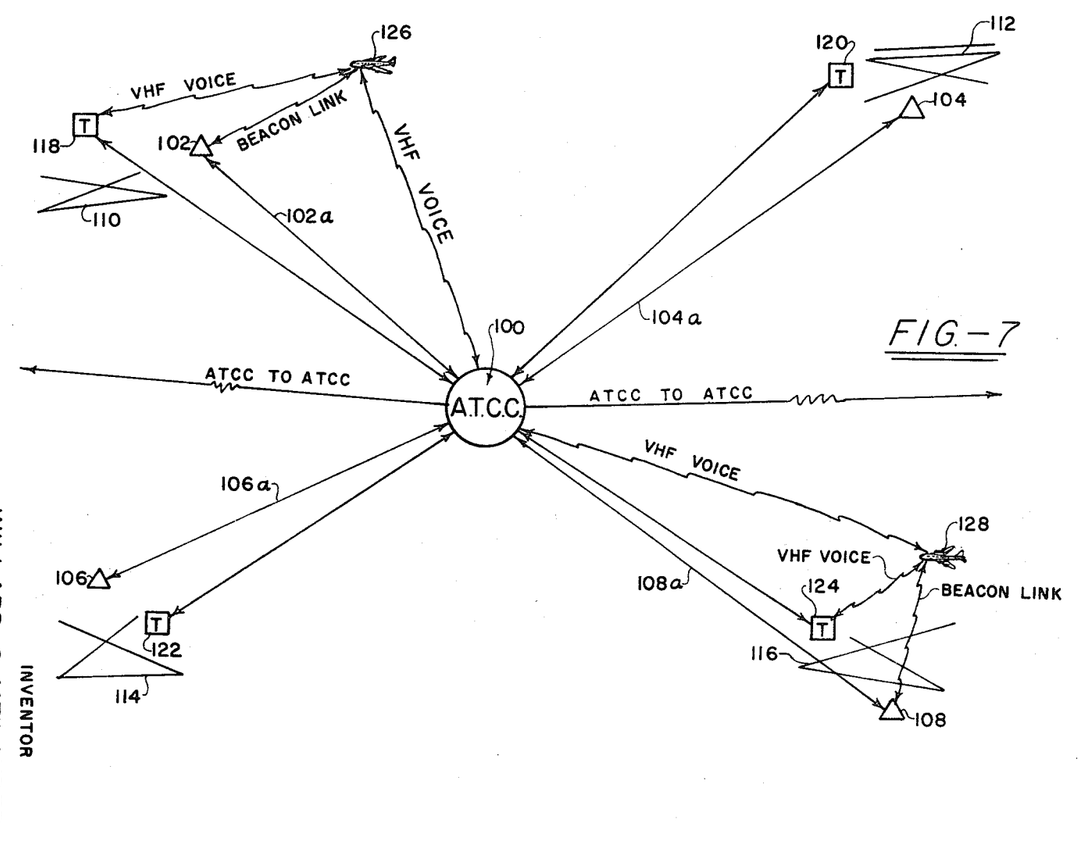
FIG. 7 is a schematic illustration of a typical area communication system plan.

One of the problems inherent in a system plan of the type shown in FIG. 7 is with respect to necessarily overlapped interrogation between adjacent trilateration systems. In other words, the transmitted outputs from the trilateration system 102 will overlap some into the sector controlled by trilateration systems 104 and 106. This overlapping in the past has caused some errors and confusion in beacon link systems because aircraft may be interrogated by more than one system. In order to overcome this problem of prior art, the invention contemplates that each aircraft controlled by ATCC 100 will be assigned to a specific trilateration system on the basis of its nearness to its assigned trilateration system. When the aircraft are assigned to specific trilateration systems they are ordered in sequentially increasing range from a point (usually the transmitter location) at the system. The systems are so coordinated by the associative processor at the ATCC 100 that only one system will be interrogating aircraft within a line of sight distance from any other system at the same time. There may be simultaneous interrogation from systems that are not within line of sight distance from each other. Hence, no overlap between adjacent systems will occur. This range ordered sequential interrogation also eliminates overlap of signal reception with respect to each individual trilateration system 102 through 108. The details of this range ordered interrogation are explained further hereinafter.

EXAMPLE OF SYSTEM OPERATION

The ground observed position data could be furnished as a part of the interrogation to each aircraft typically every 10 seconds and control signals when required. For example, 2,000 aircraft in a trilateration sector of a 200 nautical mile square, and with the antennae 12, 14 and 16 positioned substantially centrally thereof, and allowing approximately 150 microseconds per aircraft interrogation, all aircraft will be interrogated one time in 0.3 seconds. It is assumed that position data after initial correction would be sent to the pilot every 10 seconds more or less depending on the situation. However, in case of a conflict, an immediate change in heading and/or altitude could be commanded without delay. This type of anticollision control by a data processor 22 is explained in more detail in my co-pending application identified above. After each aircraft in the sector is discretely interrogated once per cycle, only those aircraft not replying would be interrogated on the next interrogation mode.

Each 150 microsecond interrogation time slot contains space for information and control data when each aircraft position has been initially determined by the beacon trilateration system. Since the identification code for each aircraft can be transmitted in nominally 15–30 microseconds, there is additional time available for control and position information transmission. During an information transmission period from ground to aircraft, the aircraft identification code will be immediately followed with a special code indicating that additional data follows. This is indicated as Data in FIG. 5. A code will identify the type of data being transmitted. The data transmission from the central beacon transmitter 10 will be repeated for each aircraft until a confirmation signal is received from each aircraft that the message was received. Any suitable type of numerical or analog display mounted in the aircraft could receive the Data, and this is described more fully in the section entitled AIR TO GROUND DATA LINK hereinafter. The air to ground confirmation signal will follow each aircraft standard altitude reply at a specified time interval.

The following list is an example of the ground to air data link items and possible bit lengths that might be transmitted to the aircraft. The location in memory and format of data can be determined by proper programming of the instruction bank 32, control circuit 34 and the arithmetic unit 36 for storage in the associative memory bank 31. It should be understood that this information is determined by means of the trilateration system, and by the Air Traffic Control System.

| Item | Example Word Length Bits |
| --- | --- |
| Identification Code | 20 |
| Data Identification | 4 |
| Call ARTCC | 2 |
| Position Data | 20 |
| Heading Command | 10 |
| Altitude Command | 10 |
| Altitude Change | 6 |
| Heading Change | 8 |
| Check Point | 20 |
| Time at Check Point | 12 |
| Altitude at Check Point | 10 |

It should thus be understood that in an associative processor embodiment of data processing simultaneous calculations of the $x$ and $y$ coordinates for all aircrafts are made and recorded in the associative memory bank 31. In effect, a mask register 38 allows the arithmetic unit 36 as controlled by circuit 34 to look sequentially at the $d1$ and $d2$ bits for every aircraft stored in memory simultaneously beginning with the least significant bit, or vice versa, and make proper arithmetical computations in the respective arithmetic unit 36 as instructed by control circuit 34. The mask register also controls the position of the computed result of the respective unit 36 into associative memory bank 31. All of this is well understood by those skilled in the art. Similarly, the mask register co-ordinates proper computation with respect to bits $d3$, and the $x$ and $y$ information is generated for every aircraft simultaneously. This masking and computing operation is more fully described in U.S. Pat. Nos. 3,300,760, 3,278,904, 3,380,033 and is generally well understood by those skilled in the art.

$x$, $y$ and $z$ DETERMINATION

A typical determination of $x$, $y$ and $z$ information and the degree of accuracy achieved follows:

Since the trilateration position system determines aircraft position by distance measurements only rather than by a combination of distance and angle measurements as in current beacon and radar systems, the position determination can be much more accurate than in current beacon and radar systems. For example, suppose that the approximate right triangle shown in FIG. 2 is an exact right angle that transmitter receiver 1, identified by numeral 24 in FIG. 2 is at the origin of a Cartesian co-ordinate system, that receiver 2, identified by numeral 26 is on the X axis, receiver 3, identified by numeral 28 is on the Y axis, and distances $D_1$ and $D_2$ are equal and called $D$ then the position of an aircraft in this $X$, $Y$, $Z$ Cartesian co-ordinate system thus defined is given by $$X = \frac{d_1^2 - d_2^2}{2D} + \frac{D}{2}$$

$$Y = \frac{d_1^2 - d_3^2}{2D} + \frac{D}{2}$$

$$Z = \sqrt{(d_1^2) - (X^2 + Y^2)}$$

Due to errors made in measuring the various signal occurrences times required to determine $d_1$, $d_2$, and $d_3$, the $X$ and $Y$ values as indicated above will be in error. For example the error in the $X$ position is given by $$\Delta X = (d_1 \Delta d_1 - d_2 \Delta d_2)/D$$

The variance of $\Delta X$ can be determined from $$E(\Delta X^2) = \frac{d_1^2}{D^2} E(\Delta d_1^2) + \frac{d_2^2}{D^2} E(\Delta d_2^2) - \frac{2d_1 d_2}{D^2} E(\Delta d_1 \Delta d_2)$$

There are four main contributors to the positional error. These are the beacon jitter, with standard deviation $\sigma_j$, signal attenuation error, with standard deviation $\sigma_s$, receiver noise error, with standard deviation $\sigma_n$, and the clock measurement error, with standard deviation $\sigma_c$. The component parts of $E(\Delta X^2)$ are related to the above mentioned main contributors by the relations $$E(\Delta d_1^2) = (C^2/4)(\sigma_s^2 + \sigma_j^2 + \sigma_n^2 + \sigma_c^2)$$
$$E(\Delta d_2^2) = (C^2/4)(\sigma_s^2 + \sigma_j^2 + 5\sigma_n^2 + 5\sigma_c^2)$$
$$E(\Delta d_1 \Delta d_2) = (C^2/4)(\sigma_s^2 + \sigma_j^2) - (C^2/4)(\sigma_n^2 + \sigma_c^2)$$

Typical values of the four main contributors to the positional error are $\sigma_s = 0.001$ $\mu$sec at 5,000 ft. altitude and 0.08 $\mu$sec at 60,000 ft.;

$\sigma_n = 0.003$ $\mu$sec at 5,000 ft. altitude and 0.023 $\mu$sec at 60,000 ft.;

$\sigma_j = 0.1$ $\mu$sec and $\sigma_c = 0.01$ $\mu$sec.

For an altitude of 15,000 ft. and an azimuth angle of 45°, the expected errors in the X and Y coordinate position of an aircraft as determined by the trilateration system are equal and vary with range. Computed errors for various ranges are given in the table below.

| RANGE | 3 σ Error Δ X = Δ Y (feet) |
| --- | --- |
| 50 | 70.0 |
| 30 | 48.6 |
| 10 | 16.75 |
| 7.68 | 10.5 |
| 0 | 38.4 |

Typical error for a conventional scanning radar or beacon system is over 6,000 feet at 50 miles. The discussion presented above has been in terms of a particular trilateration configuration, namely one in which the stations are arranged in a right triangle and the target is at a 45° azimuth. However, it should be clear to one skilled in the art that substantially the same results are obtained for other configurations which are similar to the right triangle configuration and for other aircraft positions. Thus, the marked superiority of positional accuracy of the trilateration system over present systems will also hold for all these configurations.

In a similar manner, any other computerized mathematical solutions can be generated in the unit 36 for every word in memory simultaneously so as to provide, for example, course information, speed information, time of crossing a certain track, possible conflicts with other aircraft, and the like. For the purposes of this particular invention, however, the generation of only the $x$, $y$ and altitude information is necessary.

ELIMINATION OF RETURN SIGNAL OVERLAP

However, it is an important feature of the invention to eliminate overlapping such as is illustrated in the time diagram of FIG. 3B. This is accomplished by properly programming the instructions unit 32 to control the circuit 34 so that after all information regarding each aircraft has been stored in the memory bank 31, an operation is accomplished to determine which aircraft is closest to the transmitter 10. This aircraft is interrogated through transmitter 10. Following this, all remaining aircraft are interrogated in sequential order of their proximity to transmitter 10. Naturally, this arrangement takes place after all interrogations of the aircraft originally have been completed and positions initially determined, but all subsequent interrogations will then occur sequentially according to range. This will substantially avoid the intermingling shown in FIG. 3B since the interrogation reply from each aircraft should return before the interrogation reply from the next aircraft because of the proportional distance interrogation relationship. Since the arranging of the interrogations can be done in less than 10 microseconds per aircraft, the arrangement of the aircraft according to distance from transmitter 10 can easily occur within the 0.3 second total interrogation period defined above. However, in addition, the invention does contemplate that before each successive interrogation of aircraft the processor 22 will be programmed to determine if a signal could be received at transmitter receiver 1 at substantially the same time as the next interrogation. If this is the case the next aircraft interrogation will be automatically delayed by some appropriate interval of time such as 60 microseconds so the return signal will not be obstructed by the transmitted signal.

Provision for control of aircraft in the area not having a flight plan and known identity code may also be included in this system. A standard interrogation frame time of 0.3 seconds would be followed by a short period for requesting a mode 3/A identification reply from all non-flight plan or non-reporting aircraft. This could be done by interrogation using a unique interrogation code calling for an identity reply. The associative processor 22 could be programmed in the instructions section 32 to direct beacon transmitter 10 to perform such transmission.

After the non-flight plan aircraft have replied with their selected identity codes, they are then commanded to reply with their altitude upon receipt of the correct identity code, which again is programmed in the instructions bank 32. These aircraft can then be handled in the same manner as aircraft with approved flight plans.

AIR TO GROUND DATA LINK

It should be understood that each aircraft carries a beacon transmitter or transponder to transmit a pulse when triggered by the transmitter of the trilateration system. The standard aircraft beacon reply to the transmitted interrogation from the trilateration system is altitude followed by data link information. The additional aircraft data is transmitted to provide the required inputs to the processor 22 so as to give this requested or desired information to the Air Traffic Control Center.

Figure 6:
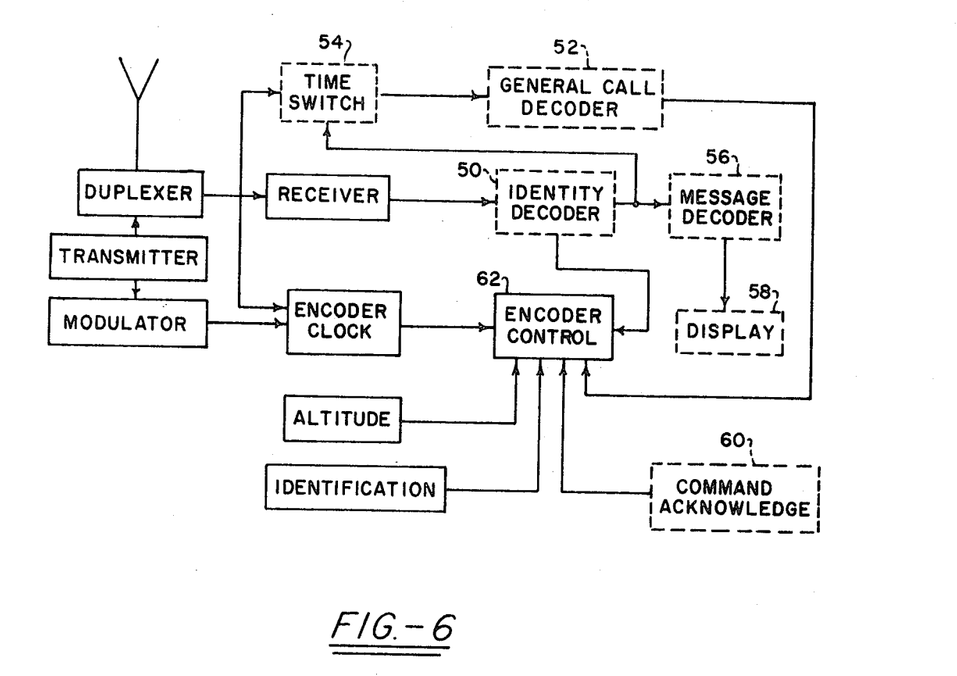
FIG. 6 is a block diagram of a typical beacon system showing the additional structure necessary to constitute the preferred embodiment of the invention.

The aircraft beacon system functions very similar to designs that satisfy the U. S. National Standard for the IFF Mark X (SIF) / Air Traffic Control Radar Beacon Systems SIF/ATCRBS. The major difference is that the interrogation signal now consists of the selected identification code for the aircraft in addition to the unique identity code mode. The beacon decoder 52 of FIG. 6 is designed to recognize a request to reply to a general interrogation code if its own specific code interrogation has not been received in the last few seconds. This supplies the identity for processor 22, for control of new aircraft entering the airspace, as explained previously.

The major equipment additions, as shown by FIG. 6 of the drawings, are those blocks indicated by dotted lines. Essentially, they include an identity decoder 50, general call decoder 52, a time switch 54 to inhibit the general call decoder 52, a message decoder 56, a pilot's display 58 of command, control or navigation information, and a command acknowledge circuit 60. Other desirable airborne features may include a dual receiver with each coupled to independent antennae so arranged that the transmitted signal is fed to the antenna having the greatest receive signal strength. Other information which might be fed into an encoder control 62 include, altitude rate, heading change, acceleration sensing, turn rate, air speed, intended heading change for encoding information to be transmitted via air to ground data link for subsequent transfer to memory bank 31 for use by the ATCC 100, or an air controller.

The trilateration system offers one distinct advantage compared to a scanning system with regard to multipath reflection problems. Whenever a reflected path signal is received, it is always preceded by the shorter range direct path signal. This is not the case for a scanning antenna system since a reflected interrogation signal can produce a reflected false beacon reply signal through the same reflected path at the particular azimuth antenna position. When this occurs the direct path signal is not available to determine that the range was a reflected or ghost range. In this case the aircraft position is reported in error until the same reply is processed again at the correct azimuth and range position. Thus, two tracks with the same identity may appear causing system confusion.

In general for the trilateration system, the associative processor 22 can eliminate erroneous aircraft position reports due to multipath signals or reflections in the air to ground link. When the range difference between the reflected and direct path is short enough to produce pulse reply overlap or garble, the aircraft position can be determined but air to ground data may be lost. The trilateration system, employing three receivers, all at different ranges and angular positions from the aircraft is unlikely to receive similar reflected path signals in all channels. The invention contemplates the use of any suitable techniques such as voter logic known to those skilled in the art to exclude extraneous signals which arrive at improper times. Further, it is important to remember that even when the signal is garbled and errors exist in the pulse train, the aircraft position is readily determined from the first pulse of received signal at each of the receivers.

The invention contemplates that any suitable input/output system 30 would meet the objects of the invention, but preferably one that has the ability to receive and transmit large quantities of data fast, and accurately will meet the objects of the invention. Such a system might be similar to that shown in U.S. Pat. No. 3,423,735. The associative bank 31 might be similar to that shown in U.S. Pat. No. 3,381,280. The arithmetic unit 36 could be of the type shown in U.S. Pat. No. 3,380,033. While the control circuit 34 and instruction bank 32 might be typical systems as illustrated in U.S. Pat. Nos. 3,325,804 and 3,324,458, respectively.

The foregoing discussions have been based upon the use of an associative processor to perform the data processing and range ordering operations which have been described. This is the preferred embodiment of the invention. However, it should be apparent to those skilled in the art that other types of data processors such as those manufactured by Burroughs or I.B.M. would also be employed to perform the same operations.

Thus, it is seen that the objects of the invention have been achieved by providing a multiple antenna system oriented in an out of line configuration with the use of beacon information transmitted to and from the moving vehicle to determine vehicle position information with great accuracy and at high speed. Overlap and garble of received signals is eliminated by sequentially interrogating the moving vehicle with discrete pulses in accordance with their distance from the transmission beacon. Conventional associative computing techniques are utilized to determine simultaneously the x, y coordinate positions of all the moving vehicles with respect to the central transmitting beacon. The associative processing of all range information simultaneously for all moving vehicles provides the high speed capabilities of the system. Altitude is determined by simply interrogating the conventional equipment on board the moving vehicle now directing it to transmit its own altitude information together with an identity signal for that moving vehicle so that proper identification is established in the computer storage bank. Also, altitude can be computed simultaneously for each aircraft by the associative processor as defined earlier, and used to check the transmitted altimeter readings.

While in accordance with the patent statutes, only the best known embodiments of the invention have been illustrated and described in detail, it is to be particularly understood that the invention is not limited thereto or thereby, but that the inventive scope is defined in the appended claims.

What is claimed is:

1. A method to provide high speed target position information which includes the steps of
   a. providing a plurality of systems for detecting targets each covering a section of a predetermined overall area,
   b. effecting a general interrogation of all targets in the overall area through said systems,
   c. sending such known target information from each system to a data processing center,
   d. assigning each target to the system nearest to it,
   e. measuring the range of every target sent to the processing center with respect to a predetermined reference associated with the respective detecting system for the section in which the target is located,
   f. sequentially discretely interrogating each known target according to increasing range from said predetermined reference by the system covering the section in which each respective target is located until all known targets have been interrogated,
   g. interrogating for unknown targets, assigning them to systems and transferring targets moving from one system to the next, and
   h. repeating steps (b) through (g) as often as necessary to provide updated information on said known targets.

2. A high speed position acquisition system for moving vehicles which includes
   at least three antennae positioned with respect to the earth so that an angle is formed between the central antenna and those on each side thereof, the antennae being spaced at known distances of at least one-half mile relative to each other;
   an interrogation transmitter designed to transmit a vehicle identification signal;
   a receiver associated with each antenna to receive transmitted electromagnetic signals from each vehicle;
   means to time the interrogation pulse from the interrogation transmitter;
   an associative processor to receive and measure time of reply at each receiver to computer coordinate information for those signals with respect to a predetermined reference, the associative processor including means to provide sequential interrogation of each vehicle within the range of the interrogation transmitter, a memory bank to store information of each vehicle with respect to each antenna for each vehicle interrogated as a part of a word in memory, an arithmetic unit associated with each word in memory, and means to simultaneously insert respective range information for each antenna into the respective arithmetic unit for each word in memory sequentially for each antenna but simultaneously for all vehicles with respect to each antenna.

3. A system according to claim 2 where a sliding mask register is provided to achieve the simultaneous interrogation of each bit for all words in memory.

4. A high speed position acquisition system for moving vehicles which includes
   at least three antennae positioned with respect to the earth so that an angle is formed between the central antenna and those on each side thereof, the antennae being spaced at known distances of at least one-half mile relative to each other;
   an interrogation transmitter designed to transmit a vehicle identification signal;
   a receiver associated with each antenna to receive transmitted electromagnetic signals from each vehicle;
   means to time the interrogation pulse from the interrogation transmitter;
   means to receive and measure time of reply at each receiver to compute coordinate information for those signals with respect to a predetermined reference; and
   control means to arrange all vehicles sequentially according to their range from a predetermined reference point within the perimeter defined by the antennae and to subsequently interrogate the vehicles according to the range, from nearest to furthest on all interrogations subsequent to the first.

5. A high seed position acquisition system for moving vehicles which comprises
   a transpondor in each vehicle,
   means to transmit a general interrogation signal to actuate the transmitters in the vehicles,
   means to receive the transmitted signals from the vehicles and compute range and altitude information thereof relative to a predetermined point, and
   means to sequentially interrogate the vehicles with a discrete signal in accordance with the vehicle range from the predetermined point beginning with the nearest vehicle, to prevent overlapping signals.

6. A method to provide vehicle position information for a plurality of vehicles which includes the steps of
   transmitting an identification signal for all vehicles within range,
   receiving a reply signal transmission for each vehicle in response to the identification signal at at least three separate antennae spaced at an angle with respect to each other,
   sending the reply signals to a common processor,
   computing coordinate position information for each vehicle in reference to a predetermined point within the perimeter defined by the antennae, based on the reply signals, arranging the vehicles in accordance with range with respect to said predetermined point as derived by the coordinate position information, and subsequently interrogating each individual vehicle by transmission in sequence at predetermined time intervals starting with the vehicle nearest said predetermined point and continuing according to increasing distance from said predetermined point.

7. A method according to claim 6 which includes computing whether any signal should be received at about the same time as a subsequent transmission, before each such transmission, and delaying such transmission by a short predetermined time interval when such overlap of receipt and transmission would occur.

8. A method according to claim 6 which includes repetition of the steps of claim 6 at very short intervals of time, the computations of position coordinates for all targets being accomplished simultaneously and followed by sequentially arranging the targets in range order.

9. A method according to claim 8 which includes interrogating, identifying, and determining range of all additional vehicles uninterrogated during the previous time interval, the additional vehicles being arranged in range sequential order along with the previously interrogated vehicles and interrogated in subsequent time intervals along with the previously interrogated vehicles.

* * * * *

UNITED STATES PATENT OFFICE
CERTIFICATE OF CORRECTION

Patent No. 3,665,464  Dated May 23, 1972

Inventor(s) Willard C. Meilander

It is certified that error appears in the above-identified patent and that said Letters Patent are hereby corrected as shown below:

Column 2, line 38, change "side" to --site--.

Column 3, line 2, (1st line of the equation), change "$D_2$" to --$d_2$--.

Signed and sealed this 10th day of October 1972.

(SEAL)
Attest:

EDWARD M. FLETCHER, JR  ROBERT GOTTSCHALK
Attesting Officer  Commissioner of Patents